United States Patent [19]

Simon

[11] Patent Number: 5,388,322

[45] Date of Patent: Feb. 14, 1995

[54] METHOD OF MAKING A SHATTERPROOF AIR BAG INFLATOR PRESSURE VESSEL

[76] Inventor: Joseph A. Simon, 237 Lothrup, Grosse Point Farms, Mich. 48236

[21] Appl. No.: 68,957

[22] Filed: May 28, 1993

[51] Int. Cl.[6] .................. B23P 19/02; B60R 21/16; B21C 23/08
[52] U.S. Cl. .................. 29/525; 29/DIG. 47; 280/737
[58] Field of Search ............ 29/422, 506, 525, 890.09, 29/33 D, 33 T, 776, DIG. 47; 72/254, 255, 256, 711; 264/127, 209.2, 209.3, 209.7; 280/731, 733, 728 R, 736, 737, 741

[56] References Cited

U.S. PATENT DOCUMENTS

| | | | |
|---|---|---|---|
| 1,934,652 | 11/1933 | Anderson | 29/525 |
| 3,830,519 | 4/1974 | Lewis | 280/733 |
| 4,225,547 | 9/1980 | Okita | 264/209.2 X |
| 4,950,458 | 8/1990 | Cunningham | 280/736 X |
| 5,066,038 | 11/1991 | Frantom et al. | 280/737 X |
| 5,197,756 | 3/1993 | Jarboe et al. | 280/728 R |

FOREIGN PATENT DOCUMENTS 115244 1/1989 Japan .................. 29/DIG. 47
115245 1/1989 Japan .................. 29/DIG. 47

Primary Examiner—Peter Dungba Vo
Attorney, Agent, or Firm—Harness, Dickey & Pierce

[57] ABSTRACT

A shatterproof pressure vessel for storing pressurized gas used in a hybrid-type air bag inflator until the gas is expanded for inflating an air bag, is formed of a thin wall, metal tube made by extruding a metal ring axially through a constricted die orifice to provide an elongated tube. The extrusion generally aligns the metal grain structure into a generally elongated, axially oriented fiber-like configuration. End closures are secured to the opposite ends of the tube to form the sealed pressure vessel. One end closure is openable to receive an ejection from a solid propellant means which is actuated for heating and expanding the gas within the vessel. The opposite end closure is openable to release the expanding gas into a vehicle occupant restraining air bag for inflation of the bag. In the event that the gas pressure within the tube exceed the burst strength of the tube wall, the wall will split along its axial longitudinal direction to provide an opening for relieving the excess pressure, rather than shattering into fragments.

2 Claims, 3 Drawing Sheets

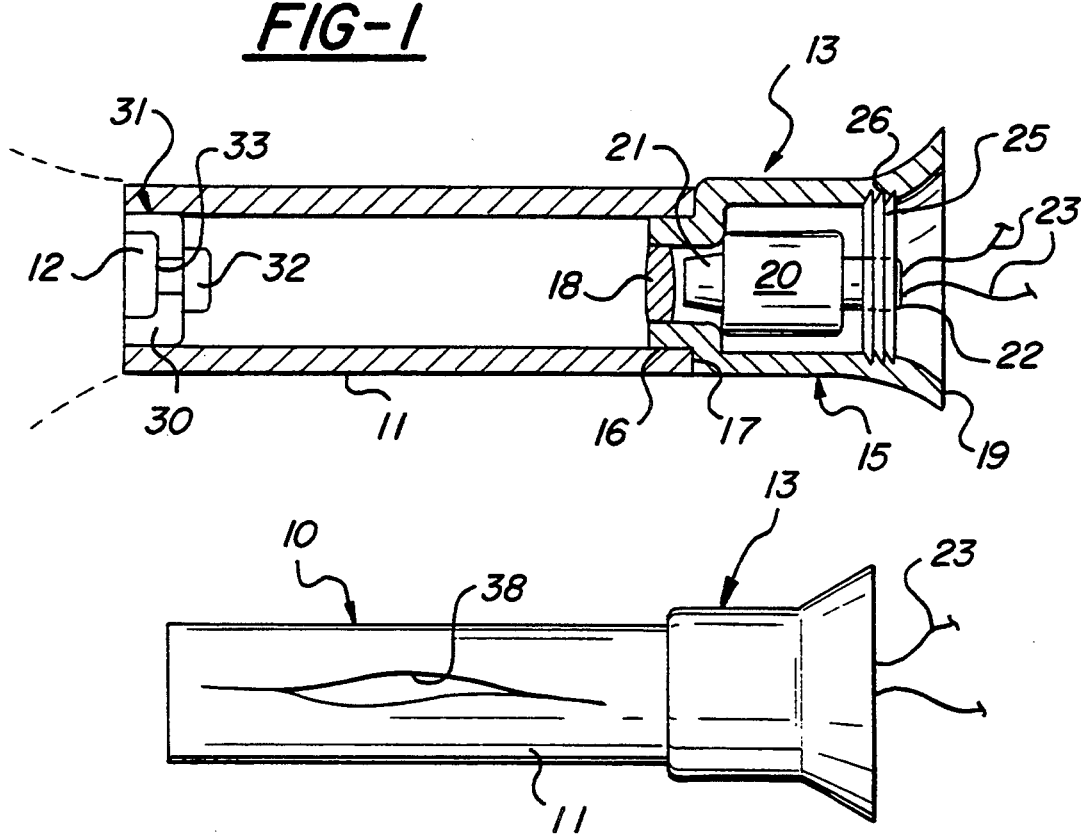
FIG-1
FIG-2
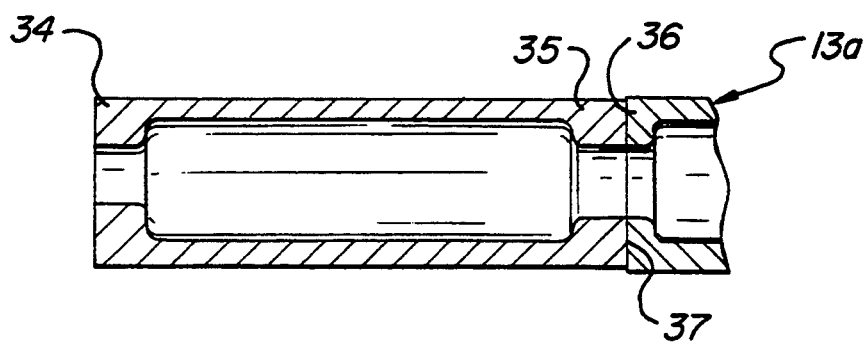
FIG-3

METHOD OF MAKING A SHATTERPROOF AIR BAG INFLATOR PRESSURE VESSEL

This invention relates to a small size, tubular pressure vessel used for the storing and the initial expansion of pressurized gas in an air bag inflator system which inflates a vehicle passenger restraint air bag to protect the vehicle occupant in an accident.

BACKGROUND OF INVENTION

In general, a vehicle occupant restraint air bag inflator system includes a pressure vessel, within which pressurized and expandable gas may be stored, and a means for rapidly expanding the gas so that the gas is expelled from the vessel into an expandable air bag in the event of an accident. One type of air bag inflator system, referred to as a hybrid system, includes a pressure vessel within which an inert gas, under pressure, is stored. A solid propellant material is stored within a suitable container at one end of the vessel. The opposite end of the vessel, which is normally sealed, is connected to the deflated air bag. In the event of an accident, that is, a sudden stop of the vehicle, a sensor acts to ignite the propellant material which, in turn, discharges into the stored pressured inert gas in the vessel to suddenly and rapidly heat the gas and cause it to expand. The expanding gas discharges through the opposite, outlet end of the vessel, into the deflated air bag. The sudden burst of expanding gas almost instantly inflates the air bag to protect the vehicle occupant and to hold the occupant against moving forwardly and striking the vehicle interior surfaces.

An example of a commercially known hybrid-type air bag inflator includes an elongated, tubular pressure vessel for containing an inert gas, such as argon gas. A solid propellant that produces gas, such as sodium azide, is arranged at one end of the inert gas-containing vessel and is separated from the interior of the vessel by an openable closure. The opposite end of the vessel is closed by a pressure sensing closure which will open upon a threshold pressure reached within the vessel. A suitable ignitor actuates the solid propellant upon receipt of a signal from a device which senses a rapid, crash-type stop of the vehicle within which the inflator is installed. Upon such ignition, the solid propellant produces the above mentioned gas, e.g., sodium azide, which bursts through the closure to the interior of the pressure vessel and heats the inert, argon gas within the container. That causes the inert gas to rapidly expand and to exceed the pressure needed to open the closure at the outlet end of the vessel. The expanding gas is directed into the deflated air bag and causes the air bag to almost instantly inflate in front of the vehicle occupant.

The particular structure described above is normally intended for use within an automotive vehicle at the passenger side of the vehicle. That is, the tubular vessel, which may be formed of an elongated tube, of the order of 3-7 inches in length, for example, is intended to be positioned within the dash board of the vehicle in front of the passenger. The same inflator system may be used elsewhere, but it is particularly useful for the front passenger side of a vehicle as well as for the occupants of the rear seats of the vehicle. The driver side of the vehicle normally requires a different type of vessel shaped to be fitted within the steering column of the vehicle.

With the foregoing tube shaped pressure vessel, it is desirable to use a seamless, thin walled, strong tube. Although bursting of the tube is unlikely, it is necessary that the vessel have sufficient strength to avoid unintended bursting caused by a gas pressure build-up within the vessel which exceeds the burst strength of the tube. In the event of unintended bursting, the vessel could fragment, creating safety and damage problems within the vehicle.

At this time, the method for producing the required vessel tube generally involves stamping and drawing a thin, flat, metal plate into a cup-shape and then elongating the cup-shape through successive stamping or drawing steps. In this process, the cup-shape is successively drawn deeper and deeper to form the final, elongated, seamless tube shape. This requires repeated handling of the part during the successive steps in the process, as well as annealing between steps. Moreover, to avoid the possibility of the finished vessel bursting and fragmenting under excessive pressure, a relatively thick steel sheet must be used. This increases the cost of the tube and increases the weight, as well as increases the level of difficulty in forming the tube.

Because air bag inflators are made in high-volume production, a manufacturing procedure which reduces the costs of manufacturing each vessel even a very small amount or which permits a reduction in the thickness of the metal used even a slight amount or which permits the use of a less expensive metal material, is highly desirable. That is, the high volume would provide a substantial total cost savings. Thus, this invention is concerned with providing a method and an improved pressure vessel tube which will increase the strength of the tube, prevent fragmentation of the tube in the unlikely event of bursting, and substantially reduce the costs of production, including permitting the use of less expensive materials.

This invention contemplates adapting a previously known extrusion procedure for making hollow tubes or shafts to make pressure vessel tubes for air bag inflators. In this procedure, ring-like metal blanks are pushed through a constricted die throat or orifice by a suitable punch. A mandrel-like extension on the punch, arranged within the ring-like blank, helps form the extruded, hollow, thin-walled, elongated tube. Such tubes are produced rapidly, one-by-one, and may be provided with either a uniform wall thickness throughout their lengths or with thickened wall sections at selected portions thereof, such as at their opposite ends. Examples of this method for forming tubes are illustrated, for example, in U.S. Pat. Nos. 4,002,286 issued Jan. 11, 1977; 4,277,969 issued Jul. 14, 1981; 4,282,831 issued Oct. 6, 1981; 4,435,972 issued Mar. 13, 1984; and, 4,991,421 issued Feb. 12, 1991.

This present invention, by utilizing a tube extrusion process, enables the formation of relatively short, small diameter, thin walled, tubular pressure vessels which are incorporated in a gas inflator system for inflating passenger restraint air bags.

SUMMARY OF INVENTION

This invention contemplates forming an air bag inflator pressure vessel, which is particularly useful in hybrid air bag inflator systems for storing pressurized gas, by extruding a ring-like blank of metal, such a mild steel, through a constricted die throat or orifice. A suitable punch presses the trailing end of the ring in an axial direction through the orifice. The punch may have one or more forwardly extending mandrel-like extensions positioned within the ring and orifice so as to form a hollow tube with either a continuously uniform wall thickness or with a wall thickness having preselected thicker and thinner areas. The tube is relatively short in length, such as for example in the range of four to fifteen inches and of a relatively small diameter, as for example, approximately three inches.

When the ring is forced through the die orifice by forwardly extruding the ring and the ring elongates into the thin wall tubular shape, its grain structure tends to elongate into an axially oriented fiber-like configuration. Such orientation of the fiber-like grain structure, enables the formation of relatively thin wall tubes from relatively low-cost mild steel. Yet it provides sufficient strength to resist bursting under unexpected excessive internal gas pressures. Moreover, the fibrous-like grain structure, in the event of unanticipated gas pressure which exceeds the burst strength of the tube, causes the tube to split open along its longitudinal or lengthwise direction to provide a gap for the sidewise escape of the unintended high-pressure gas. That split prevents fragmentation of the tube. Thus, the tube is essentially shatterproof, that is, it splits under excessive internal gas pressure rather than fragmenting.

An object of this invention is to provide a relatively short length, small diameter, thin wall pressure vessel tube which is shatterproof, i.e. resists fragmentation type of bursting, and instead will split open to release excessively overpressurized gas, should such a condition occur.

Another object of this invention is to provide a less expensive procedure for manufacturing a strong, shatterproof, pressure vessel for use within automotive vehicle in a hybrid-type of air bag inflation system.

Still another objection of this invention is to permit the manufacture of small diameter, relatively short length, pressure vessel tubular walls without the need to repeatedly deep draw and anneal the product during the manufacturing process and to permit the use of relatively less expensive and thinner wall metal. Further objects and advantages of this invention will become apparent upon reading the following description, of which the attached drawings form a part.

DESCRIPTION OF DRAWINGS

FIG. 1 is a cross-sectional, schematic view, of the pressure gas storage vessel and related parts of an air bag hybrid-type inflator system.

FIG. 2 schematically illustrates the pressure vessel with a longitudinal split formed along its length.

FIG. 3 is a cross-sectional, schematic view, of the pressure vessel tube and the fragment of the adjacent inflator part showing a modified form of tube construction.

DETAILED DISCLOSURE

Figure 4:
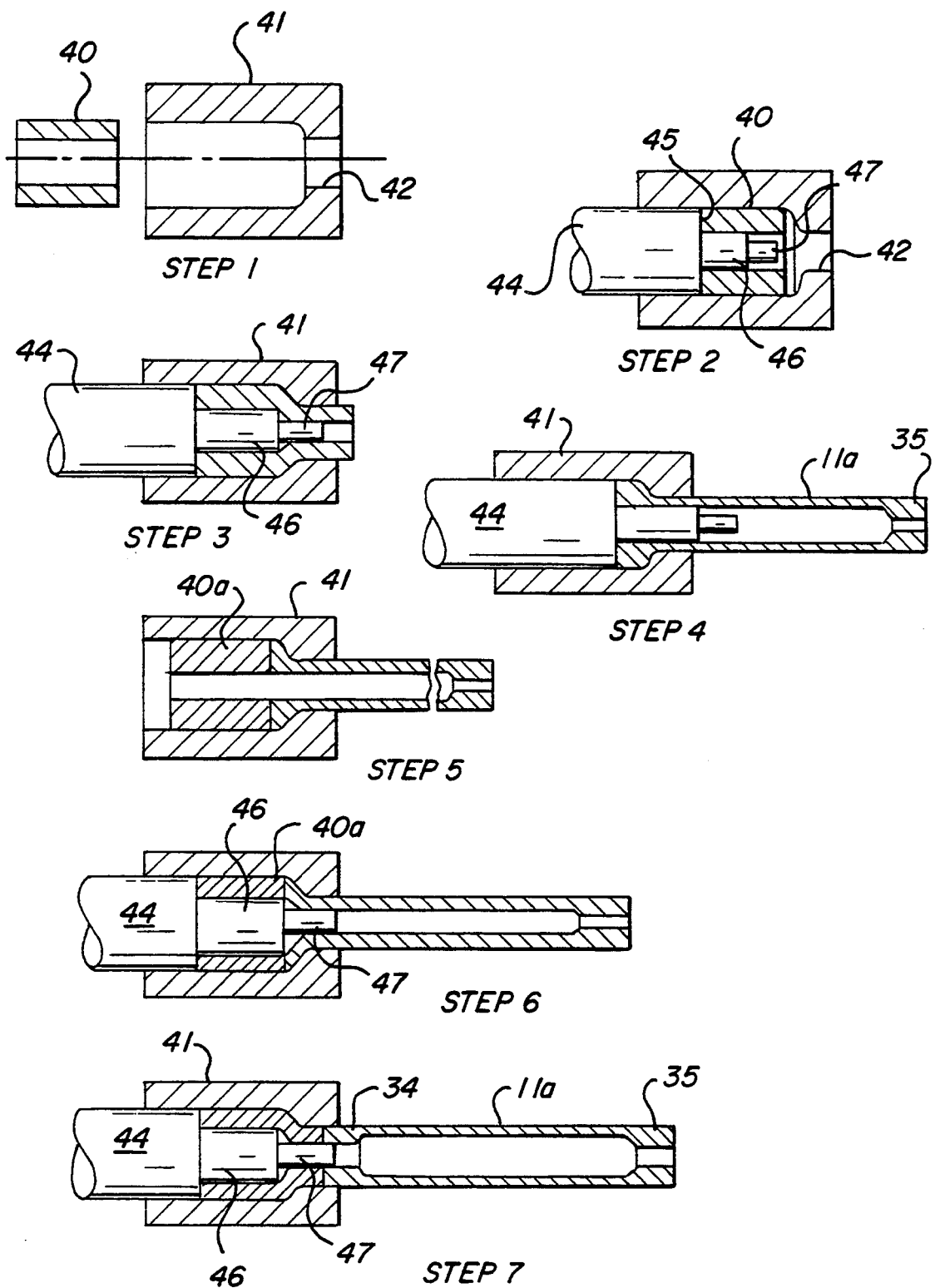
FIG. 4 is a schematic view showing the successive steps in the formation of a pressure vessel tube having thickened wall areas at its ends.

FIG. 1 schematically illustrates, in cross-section, a hybrid-type of air bag inflator intended for use in a motor vehicle, such as within the dash board area in front of the passenger side of the vehicle. The inflator pressurized gas storage tank 10 is made of an elongated tube 11 which is sealed by an outlet closure structure 12 and an inlet closure structure 13.

The tube is preferably made of a low alloy or mild steel of a short length, such as on the order of four to fifteen inches and of a small diameter, as for example, in the range of roughly three inches. The wall thicknesses may be in the range of 0.085 to approximately 0.125 inches.

The size of the tube will vary depending upon the particular air bag restraint system and the capacity needed for the storage of pressurized gas. In general, it is contemplated that the inflator device and an inflatable air bag would be installed within the dash board in front of the passenger of a automotive vehicle. Thus, the air bag inflates in front of the passenger, in the event of a crash-type stop of the vehicle, to restrain movement of the passenger. This system may also be used in other places in the vehicle, as for example, it may be built into the rear of the front seats so that the rear passengers are protected by an air bag.

Significantly, the tube is relatively small and yet must be designed to contain gas which may be normally pressurized in the range of 9000 psi, and which, upon expansion, will exert substantially greater pressure.

The inlet closure 13, is schematically illustrated since it forms no part of this present invention. For illustration purposes, however, it is shown as having a tubular extension 15 with a narrowed neck 16 fitted within and welded at 17 within the end of tube 11. A schematically shown closure plug 18 is held in place, as for example, by friction, so that it may be blown open or out of position. The opposite end of the extension 15 may be formed as a bell-shaped portion 19 or may be otherwise shaped for the purpose of installing the unit within the vehicle structure.

A solid propellant container 20 is mounted within the tubular extension 15. The container is formed with a nozzle 21 opening towards the plug 17. A suitable ignitor device 22 is formed on the container and electrical wires 23 extend to the an impact sensor (not shown) and an electrical power source, e.g., the vehicle battery (not shown), for igniting the propellant contained within the container 20. A screw-type cap 25 engages corresponding screw threads within the extension 15, to hold the propellant container in place and closes the tubular extension 15.

The outlet closure 12, at the opposite end of the tube 11, may be formed in a cup-like shape with an edge flange 30 which may be secured, as by welding at 31, to the adjacent surface of the tube 11. A pressure sensing plug 32 may be installed in the closure over a central, exhaust opening 33 and may be formed so as to blow open upon sensing a pre-determined, threshold pressure increase in the gas contained within the tube.

The detailed structure of the inlet closure, the propellant container and the system for igniting the propellant, as well as the structure of the outlet plug are shown schematically, for illustration purposes, since their structures are known and form no part of the present invention. The present invention focuses on the tube which forms the body or wall of the pressure vessel. Thus, the closure structures and shapes are conventional and may vary considerably.

FIG. 3 illustrates a modified tube 11a which has a thickened or inwardly extending flange end 34 and an opposite, similarly thickened or inwardly flanged end 35. In this schematic illustration, the inlet closure 13a may be provided with an inwardly extending flange 36 which is welded at 37 to the thickened end 35. FIG. 3 illustrates that the tube may be formed or a uniform wall thickness along its length, but with its end portions thickened for providing increased wall thicknesses for welding or attachment purposes. Thus, when the term "uniform wall thickness" is utilized herein, it includes limited, pre-selected areas of increased thickness, such as at the opposite ends, as illustrated in FIG. 3.

The hybrid inflator system includes a stored, pressurized, inert gas, such as argon gas, which is heated and caused to rapidly expand, by the ignition of a solid propellant that produces another gas, such as sodium azide. That is, the solid propellant-produced gas is injected into the stored inert pressurized gas to rapidly heat the stored gas and, consequently, rapidly increase the pressure of the stored gas. The propellant-produced gas enters the inert gas-containing tank or vessel through the openable plug 18 at the inlet end of the pressure vessel tube. The pressure build-up within the pressure vessel, causes the pressure-sensing plug 32, at the opposite end, to open and the expanding gas rushes into the deflated air bag (not shown) for rapidly inflating the air bag in front of the vehicle occupant. The ignition of the solid propellant, the formation of the gas from the solid propellant and its action in heating and expanding the inert gas and, the subsequent flow of the inert gas into the air bag takes place rapidly so that the bag is inflated almost instantaneously following an impact to the vehicle. Thus, the inflated bag is interposed between the occupant of the vehicle and the vehicle structure in front of him.

In the event that the gas pressure build-up exceeds the burst strength of a conventional pressure vessel tube, the tube might blow-up into fragments. Randomly produced fragments could present a safety hazard as well as could damage the vehicle parts in and around the dash board. To avoid such fragmentation, the tube must be made of considerable wall thickness and be made of a sufficiently strong metal alloy material to prevent bursting. However, the greater the thickness of the tube wall and the stronger the material, the greater the expense and weight of the product. Thus, the tube formed by the present invention is designed to have a relatively thin wall and to be made of a less expensive material and, yet, still avoid the possibility of fragmentation bursting by being formed to split open along its longitudinal length. Such splitting would liberate overpressurized gases within the vessel in the unlikely event of excessive overpressurization of the gas within the tube. That is, excess gas pressure is relieved through the gap formed by the splitting open of the tube. This safely relieves the internal gas pressure and prevents fragmentation of the air bag vessel. FIG. 2 schematically illustrates such a longitudinal split 38 formed in the tube wall.

FIG. 4, schematically illustrates the successive steps in the manufacture of the tube. Unnecessary parts are omitted for illustration purposes. Step I schematically illustrates, in cross-section, a ring-like blank 40 formed of low alloy or mild steel, arranged for insertion into an extrusion die 41. The die has a constricted orifice or die throat 42 through which the blank will be moved.

As shown in Step 2, the blank is arranged within the die and a punch 44 engages the trailing end of the blank. The punch has a leading end portion 45 which engages the trailing end of the blank and a central mandrel extension portion 46 fitted within the ring-like blank. In addition, it may also have a reduced diameter, lead mandrel extension 47 where it is desired to form thickened ends on the opposite ends of the tube (e.g., as shown on the tube 11a in FIG. 3). The lead end mandrel extension 47 may be omitted where a straight, uniform-thickness tube is desired (e.g., as shown in the tube in FIG. 1).

As shown in Step 3, the punch is advanced towards the orifice, as illustrated by the arrow on the punch, which causes the blank to move through the orifice and Flow inwardly around the mandrel-like extension 47.

Further movement of the punch, as shown in Step 4, causes the tube to extrude to a point where the lead mandrel extension 47 is moved forwardly of the die orifice and the central mandrel 46 is positioned within the die orifice to form the thin wall portion of the tube.

When the tube is almost fully extruded through the die, the punch is withdrawn and as shown in Step 5, a new blank 40a is inserted in the die. Then, as illustrated in FIG. 6, the punch is replaced in the die again for the new blank. Further movement or the punch, as shown in FIG. 7, with the lead mandrel extension 47 located in the die throat, results in the formation of the trailing, thickened end portion on the first tube and the beginning of the tubular extrusion of the second blank.

Figure 5:
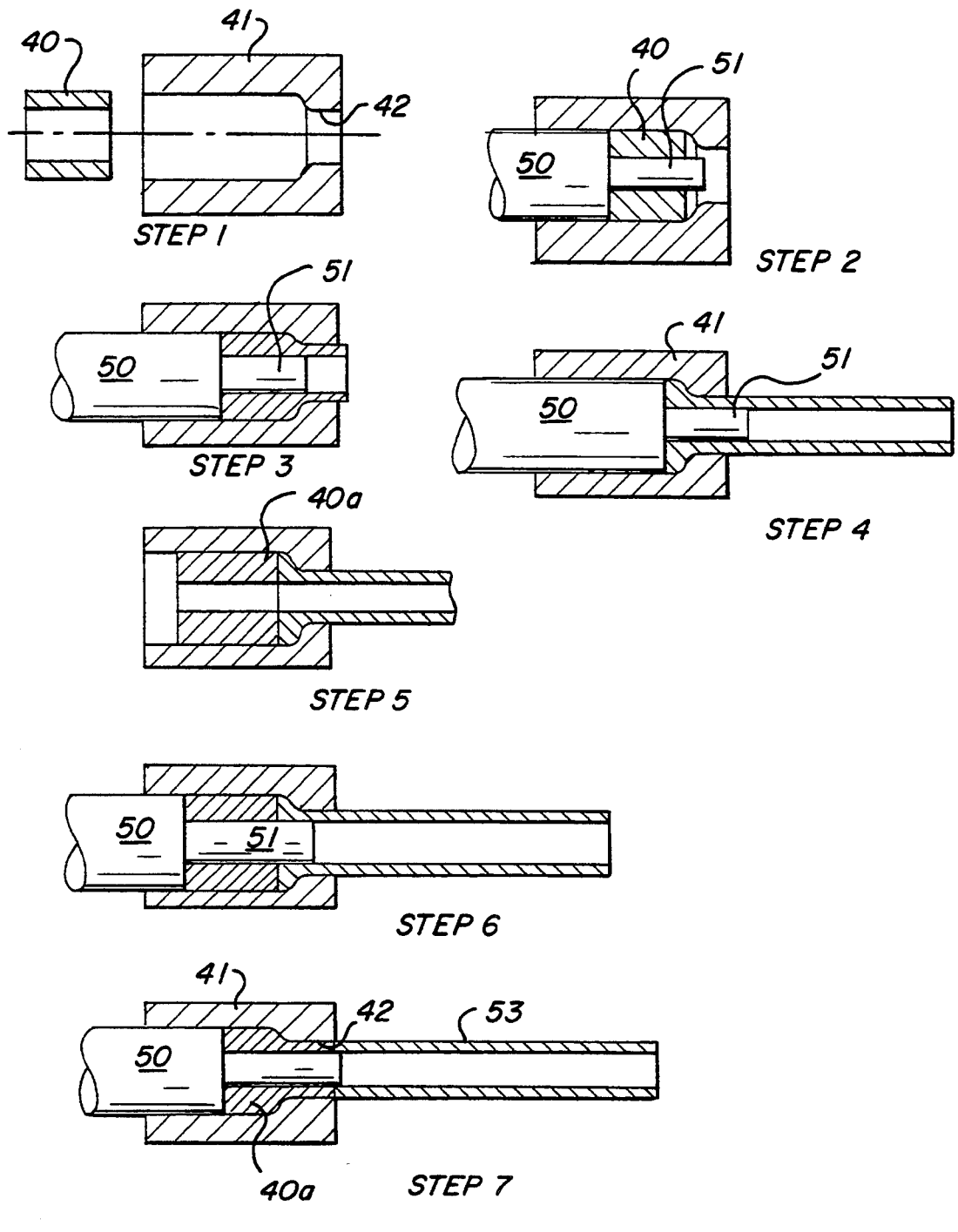
FIG. 5 is a schematic view, similar to FIG. 4, showing the successive steps in forming a pressure vessel tube having a uniform wall thickness.

FIG. 5 schematically illustrates the successive steps in forming a tube which is of uniform wall thickness throughout its length. The illustrated steps are similar to those illustrated in step 4, except for the use of a different punch 50. The punch 50 has a central mandrel extension 51 which fits within the ring-like blank 40. However, a reduced diameter mandrel extension (i.e. like the extension 47) is not used in this procedure.

In step 1 of FIG. 5, the blank 40 is positioned for insertion in the die 41. Next, in step 2, the punch 50 is positioned in the die. The punch extension 51 is fitted within the blank. The punch is advanced towards the die throat 42, as illustrated in FIG. 3, to begin extruding the blank. When the blank is almost completely extruded through the die throat, as seen in step 4, the punch movement is stopped.

Step 5, illustrates the removal of the punch from the die and the insertion of a new blank 40a into the die. Then the punch pushes the blank 40a (see FIG. 6) against the end of the previously extruded blank to continue the extrusion of blank 40. Lastly, the blank 40 is completely formed as a tube 53 having a wall of uniform cross-section, as shown in step 7 of FIG. 5, and the cycle is repeated with blank 40a.

As can be seen the tube can be formed with a uniform wall thickness as shown in FIG. 1 or in the procedure shown in FIG. 5. Alternatively, the tube may have thicker wall portions on both of its opposite ends as shown in FIG. 3 and the procedure of FIG. 4. Similarly, the tube may be formed with a thickened portion at only one end or in its middle.

The forward extrusion of the tube affects the grain structure of the metal. That is, the metal tends to form a longitudinally or axially oriented, elongated fiber-like structure. The fiber-like structure enables the tube wall to split rather than to fragment in the event of a pressure build-up within the tube that exceeds the burst strength of the tube. Thus, this structure prevents the tube from shattering or fragmenting in the unlikely event of overpressurization of the gas within the tube.

The lengths and diameters of the tube may be varied considerably, as mentioned above. However, the formation of the tube is considerably less expensive than in the prior used deep drawing and annealing processes. In addition, it is possible to utilize thinner-walled tubes, that is, to use less metal materials and less expensive metal alloys which reduce the costs and the weight of the device.

This invention may be further developed within the scope of the following claims. Having fully described an operative embodiment of this invention, I now claim:

1. A method for forming a shatterproof air bag providing a steel ring shaped blank, the wall material of said blank having an initial steel grain structure;

forcing the blank, in its axial direction, through a constricted extrusion die orifice by a punch means having forwardly extending central mandrel, thereby forwardly extruding the blank into a substantially uniform hollow cylindrical, elongated tube having a generally uniform wall thickness, and thereby elongating said initial steel grain structure of said wall material of said blank, during the forward extrusion, into a generally elongated, axially oriented, fiber structure;

securing closures on the opposite ends of said elongated tube, thereby forming a sealed vessel for storing a pressurized gas;

and forming said uniform wall thickness of said elongated tube of a strength sufficient to normally contain a predetermined gas pressure, but with the tube wall being splitable in an axial direction of the tube along the elongated axially oriented fiber structure formed in the grain structure of the wall material, to provide an axially elongated opening in the tube wall for release of gas in the event that the gas pressure exceeds said pre-determined pressure, to prevent the tube wall from shattering into fragments.

2. The method as defined in claim 1, and said pressure vessel tube being formed of a length which is considerably greater than its diameter;

and forming one of said closures to open in response to ignition of a solid propellant material arranged adjacent thereto, for passing a gas generated by the ignited propellant into the tube for heating the stored gas, thereby, increasing the pressure of the stored gas in the tube;

and forming said other closure to be openable to pass the increased pressurized stored gas from the vessel to an expandable air bag.

* * * * *

UNITED STATES PATENT AND TRADEMARK OFFICE
CERTIFICATE OF CORRECTION

PATENT NO. : 5,388,322

DATED : February 14, 1995

INVENTOR(S) : Joseph A. Simon

It is certified that error appears in the above-indentified patent and that said Letters Patent is hereby corrected as shown below:

Column 6, line 10, change "Flow" to --flow--.

Signed and Sealed this

Seventeenth Day of October, 1995

Attest:

BRUCE LEHMAN

Attesting Officer     Commissioner of Patents and Trademarks